(12) United States Patent
Pond et al.

(10) Patent No.: US 11,156,165 B2
(45) Date of Patent: Oct. 26, 2021

(54) FIRE SEAL ASSEMBLIES FOR AIRCRAFT ENGINES

(71) Applicant: The Boeing Company, Chicago, IL (US)

(72) Inventors: Morgan A. Pond, Lake Stevens, WA (US); James R. Schnelz, Seattle, WA (US)

(73) Assignee: The Boeing Company, Chicago, IL (US)

( * ) Notice: Subject to any disclaimer, the term of this patent is extended or adjusted under 35 U.S.C. 154(b) by 399 days.

(21) Appl. No.: 16/440,326

(22) Filed: Jun. 13, 2019

(65) Prior Publication Data

US 2020/0392902 A1 Dec. 17, 2020

(51) Int. Cl.
*F02C 7/25* (2006.01)
*B64D 27/10* (2006.01)
*B64D 45/00* (2006.01)

(52) U.S. Cl.
CPC .............. *F02C 7/25* (2013.01); *B64D 27/10* (2013.01); *B64D 45/00* (2013.01); *B64D 2045/009* (2013.01)

(58) Field of Classification Search
CPC ... F02C 7/24; F02C 7/25; B64D 27/00; B64D 27/26; B64D 45/00
See application file for complete search history.

(56) References Cited

U.S. PATENT DOCUMENTS

| 4,758,028 A * | 7/1988 | Davies | F16J 15/065 |
| | | | 16/2.2 |
| 5,014,917 A * | 5/1991 | Sirocky | B64G 1/50 |
| | | | 239/265.11 |
| 5,458,343 A * | 10/1995 | Dornfeld | F16L 5/08 |
| | | | 277/503 |
| 5,910,094 A | 6/1999 | Kraft et al. | |
| 10,024,242 B2 * | 7/2018 | Goulds | F02C 7/28 |
| 2006/0101805 A1 | 5/2006 | Greco | |

(Continued)

FOREIGN PATENT DOCUMENTS

| CN | 105083565 A * | 11/2015 | ............. B64D 27/26 |
| WO | WO-2020240107 A1 * | 12/2020 | ............... F02C 7/25 |

OTHER PUBLICATIONS

European Patent Office, "Extended European Search Report," issued in connection with European Patent Application 20173379.7, dated Oct. 30, 2020, 6 pages.

*Primary Examiner* — Michael H Wang
(74) *Attorney, Agent, or Firm* — Hanley, Flight & Zimmerman, LLC

(57) ABSTRACT

Fire seal assemblies for aircraft engines are described herein. An example fire seal assembly includes a first L-cap having a first leg and a second leg extending outward from the first leg, and a second L-cap having a third leg and a fourth leg extending outward from the third leg. The first and third legs are to be coupled to a core service disconnect (CSD) on a pylon of an aircraft, and the second and fourth legs are to extend outward and engage sides of a firewall of an engine of the aircraft. The first seal assembly further includes a seal coupled to the first and third legs and disposed between the second and fourth legs, a first end plug disposed between a first end of the seal and the second leg, and a second end plug disposed between a second end of the seal and the fourth leg.

20 Claims, 8 Drawing Sheets

(56) References Cited

U.S. PATENT DOCUMENTS

| | | | |
|---|---|---|---|
| 2014/0262358 A1* | 9/2014 | Livingston | A62C 2/06 169/45 |
| 2015/0048202 A1* | 2/2015 | Takeuchi | B64C 7/00 244/54 |
| 2018/0362177 A1* | 12/2018 | Scannell | B64D 33/02 |
| 2019/0061966 A1 | 2/2019 | West | |

* cited by examiner

FIRE SEAL ASSEMBLIES FOR AIRCRAFT ENGINES

FIELD OF THE DISCLOSURE

This disclosure relates generally to aircraft and, more particularly, to fire seal assemblies for aircraft engines.

BACKGROUND

Due to regulatory requirements, aircraft engines are generally required to include fire seals that are capable of containing and isolating a fire from within the propulsion components of the aircraft engine (e.g., the gas turbine engine). The fire seals are intended to prevent such a fire from spreading to other areas of the engine and/or to surrounding aircraft components.

SUMMARY

An example fire seal assembly disclosed herein includes a first L-cap having a first leg and a second leg extending outward from the first leg, and a second L-cap having a third leg and a fourth leg extending outward from the third leg. The first and second L-caps are disposed adjacent each other and form a u-shaped channel. The first and third legs are to be coupled to a core service disconnect (CSD) on a pylon of an aircraft, and the second and fourth legs are to extend outward and engage sides of a firewall of an engine of the aircraft. The example first seal assembly further includes a seal coupled to the first and third legs and disposed between the second and fourth legs, a first end plug disposed between a first end of the seal and an inner surface of the second leg, and a second end plug disposed between a second end of the seal and an inner surface of the fourth leg.

An example aircraft disclosed herein includes a pylon with a core service disconnect (CSD), an engine coupled to the pylon, the engine having a firewall, a left horizontal thrust reverser seal extending along a left side the CSD and a left side of the firewall, a right horizontal thrust reverser seal extending along a right side of the CSD and a right side of the firewall, and a fire seal assembly. The fire seal assembly includes a first L-cap having a first leg coupled to the CSD and a second leg extending outward from the first leg and in contact with the left side of the firewall. At least a portion of the left horizontal thrust reverser seal is in contact with an outer surface of the second leg. The fire seal assembly also includes a second L-cap having a third leg coupled to the CSD and a fourth leg extending outward from the third leg and in contact with the right side of the firewall. At least a portion of the right horizontal thrust reverser seal is in contact with an outer surface of the fourth leg. The fire seal assembly further includes a seal disposed between the second and fourth legs.

Figure 1:
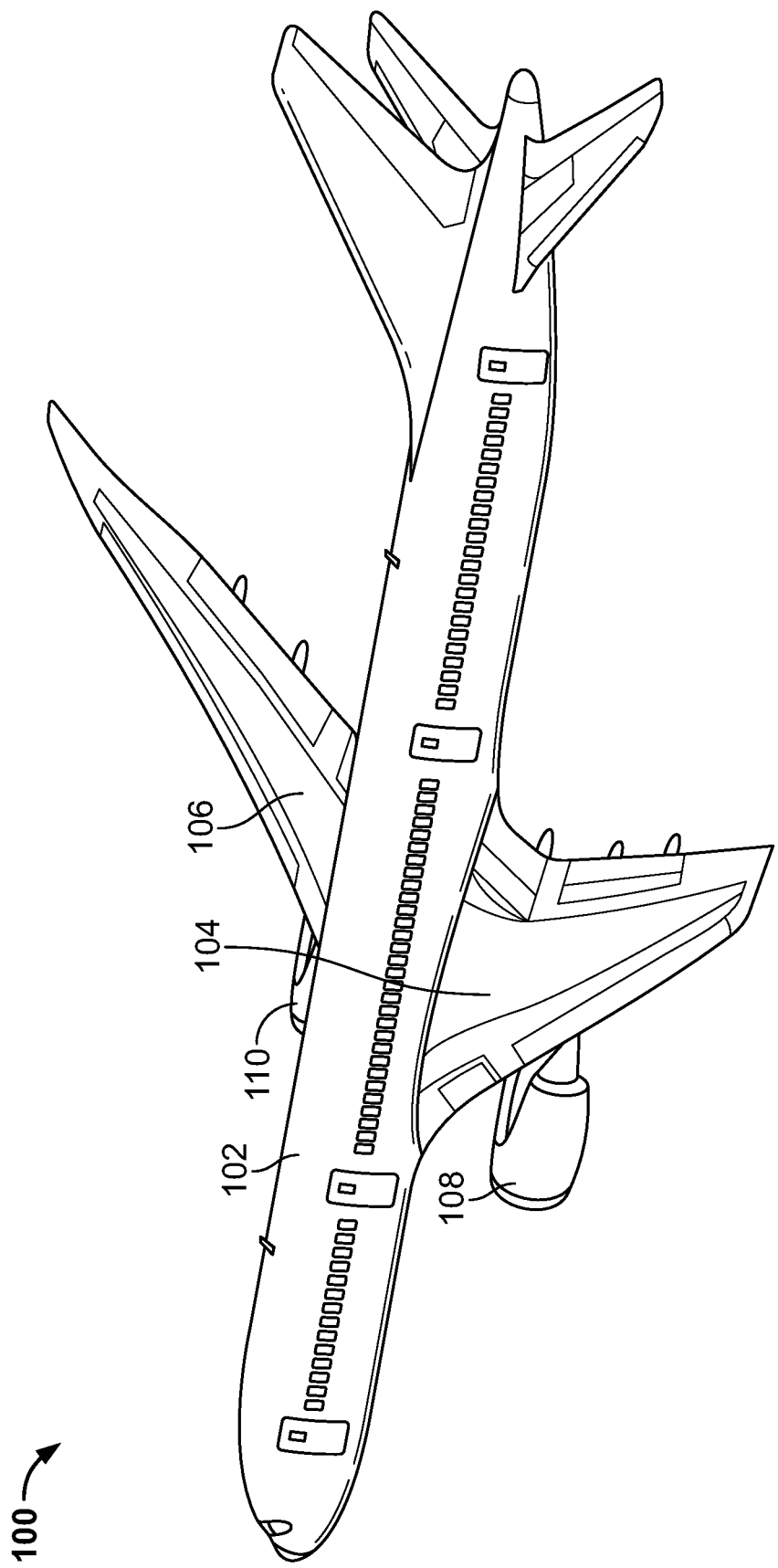
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components that may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft engines are typically connected to wings of an aircraft. In known commercial aircraft, for example, each engine is coupled to a structural beam of the wing known as a pylon. Federal Aviation Administration (FAA) regulations generally require the use of firewalls and/or fire seals to contain a fire within the engine core and prevent the fire from spreading to other parts of the engine and/or other components of the aircraft, such as the pylon.

One common fire seal boundary that must be formed is a core compartment firewall, which separates the core compartment from a strut dry bay (the pylon). This seal boundary is formed by left and right horizontal thrust reverser (TR) seals that run along the sides of the pylon and extend to an engine firewall (which separates the engine core from the fan duct). Left and right vertical TR seals run down the sides of the firewall. A core service disconnect (CSD) extends downward from the pylon and provides connections to the various hydraulic, electrical, and fuel lines leading to the engine core. The CSD is spaced apart from the engine firewall. Therefore, a fire seal assembly (sometimes referred to as a CSD fire seal) is disposed between the engine firewall, the CSD, and the thrust reverser seals to form a fire seal between these parts. A known fire seal assembly includes a P-seal that is connected to the CSD. The P-seal is engaged with the engine firewall to fill the space between the CSD and the engine firewall. The ends of the P-seal are engaged with the left and right TR seals.

These types of seals must also be able to maintain a sufficient seal even when deflections or movements occur. In particular, when the engine is powered up (e.g., during take-off), the engine produces a large amount of thrust. This large thrust can cause the engine to move or deflect slightly relative to the CSD and the pylon. Therefore, the fire seal assembly must be able to maintain a sufficient seal between the various parts as small movements occur.

It recent years, it has become more desirable to use larger, more powerful engines on commercial aircraft, especially those with larger bypass ratios (which is the mass flow rate of the bypass stream to the mass flow rate entering the core). These larger, more powerful engines may result in larger deflections of the engine relative to the CSD and the pylon.

Disclosed herein are example fire seal assemblies that can advantageously maintain a sufficient fire seal between a CSD, an engine firewall, and left and right TR seals and throughout larger movements of the engine and higher operating temperatures, such as those caused by a larger, more powerful engine. Thus, the example seal assemblies disclosed herein enable the user of larger, more powerful engines than known fire seal assemblies.

An example fire seal assembly disclosed herein includes a first L-cap and a second L-cap. The first and second L-caps are coupled to the CSD. The first and second L-caps includes legs that extend outward from the CSD and form a u-shaped channel. One or more P-seals are coupled to the L-caps and disposed in the u-shaped channel between the legs. The P-seal(s) is/are to extend the engine firewall. The legs of the L-caps extend beyond the P-seals and engage the sides of the engine firewall such that the P-seals are enclosed by the L-caps and the engine firewall. In some examples, end plugs are disposed between the ends of the P-seals and the inner surfaces of the legs, thereby creating a tight seal between the P-seals and the legs of the L-caps. The left and right horizontal TR seals run along the outer surfaces of the legs between the sides of the pylon and the sides of the engine firewall. If the engine moves forward or rearward (e.g., during take-off), the legs slide along the sides of the firewall, thereby maintaining a constant, smooth engagement between all of the parts. Further, if the engine shifts or moves sideways (e.g., inboard or outboard), the legs of the L-caps bend inward or outward, but maintain sufficient contact with the outer surfaces of the engine firewall. Additionally, even with vertical movement of the engine, the firewall and the TR seals may slide up and down along the legs. In all instances, the L-caps ensure a tight seal between the CSD, the engine firewall, and the left and right TR seals.

Now turning to the figures, FIG. 1 illustrates an example aircraft 100 in which the examples disclosed herein can be implemented. The aircraft 100 includes a fuselage 102, a first wing 104 (a left wing) coupled to and extending outward from the fuselage 102, and a second wing 106 (a right wing) coupled to and extending outward from the fuselage 102. In the illustrated example, the aircraft 100 includes a first engine 108 carried by the first wing 104 and a second engine 110 carried by the second wing 106. In other examples, the aircraft 100 may include more than two engines.

Figure 2:
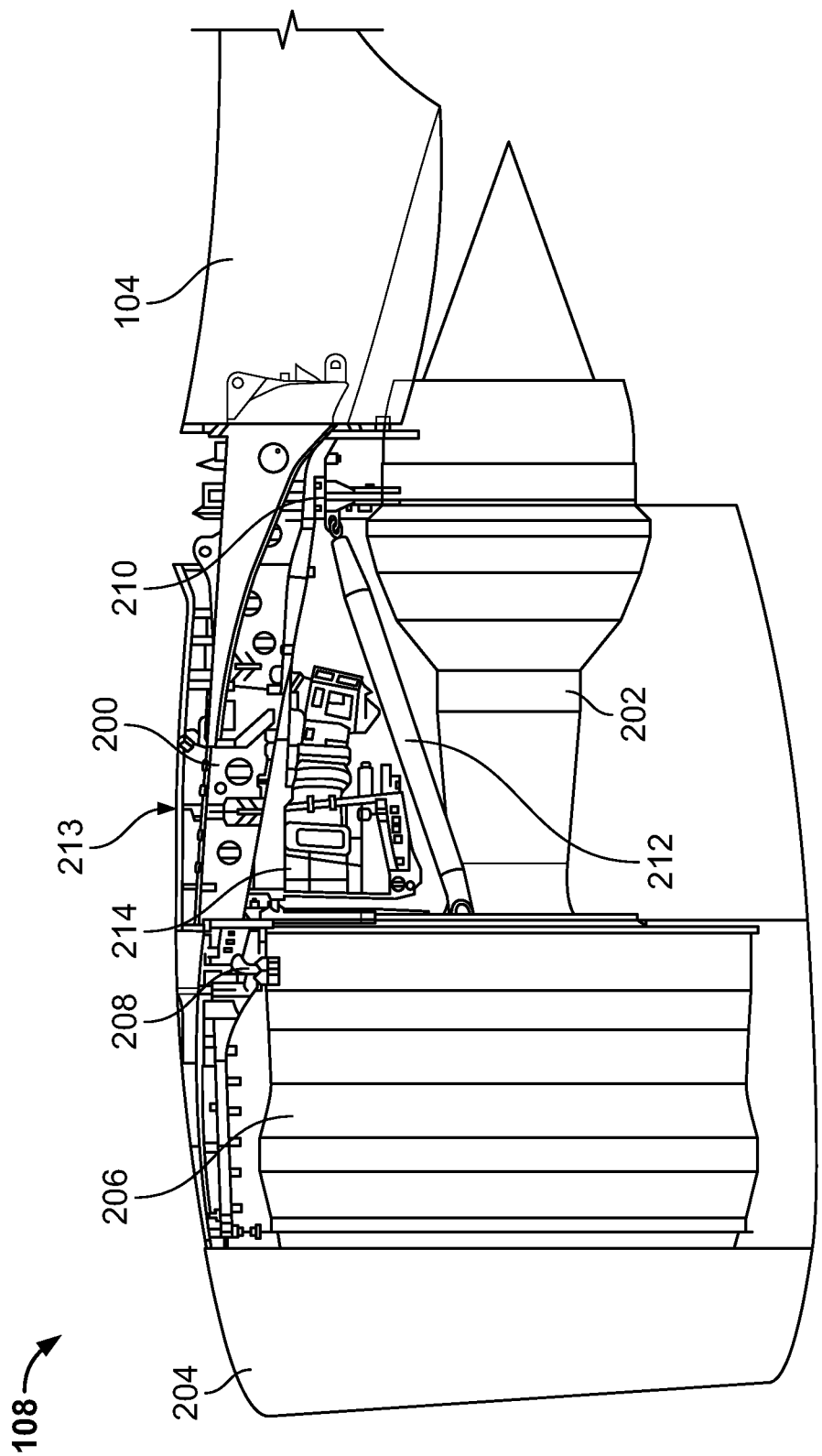
FIG. 2 is a side view of an example engine of the aircraft of FIG. 1.

FIG. 2 is a side view of the first engine 108. Some of the panels of the first engine 108 have been removed to expose various parts within the first engine 108 and the first wing 104. As shown in FIG. 2, the first wing 104 includes a pylon 200 (sometimes referred to as a strut). The first engine 108 is coupled to the pylon 200 and, thus, coupled to the first wing 104. The first engine 108 has an engine core 202 (such as a gas turbine engine) and a fan (shown in detail in connection with FIG. 4) disposed within a nacelle 204. The engine core 202 drives the fan to produce thrust. The fan is rotatable in a fan cowl compartment 206.

In the illustrated example, the first engine 108 is coupled to the pylon 200 via a forward mount 208 and an aft mount 210. More specifically, in this example, the fan cowl compartment 206 is coupled to the pylon 200 at the forward mount 208, and the engine core 202 is coupled to the pylon 200 at the aft mount 210. The forward and aft mounts 208, 210 allow for small movement of the first engine 108 relative to the pylon 200. For example, the first engine 108 may roll, yaw, or move forward or backward. In the illustrated example, one or more thrust links 212 (e.g., tie rods) are coupled between the aft mount 210 and the fan cowl compartment 206. The thrust links 212 help absorb and/or distribute thrust forces generated by the first engine 108.

The pylon 200 forms a strut box 213. Various hydraulic lines, electrical lines, and fuel lines are routed through the strut box 213. In the illustrated example, the first wing 104 includes a core service disconnect (CSD) 214 that is coupled to and extends downward from the pylon 200 (and, thus, forms part of the pylon 200). The CSD 214 is a structural compartment that contains or forms the connections between the hydraulic, electric, and fuel lines in the strut box 213 and the corresponding lines in the engine core 202.

Figure 3:
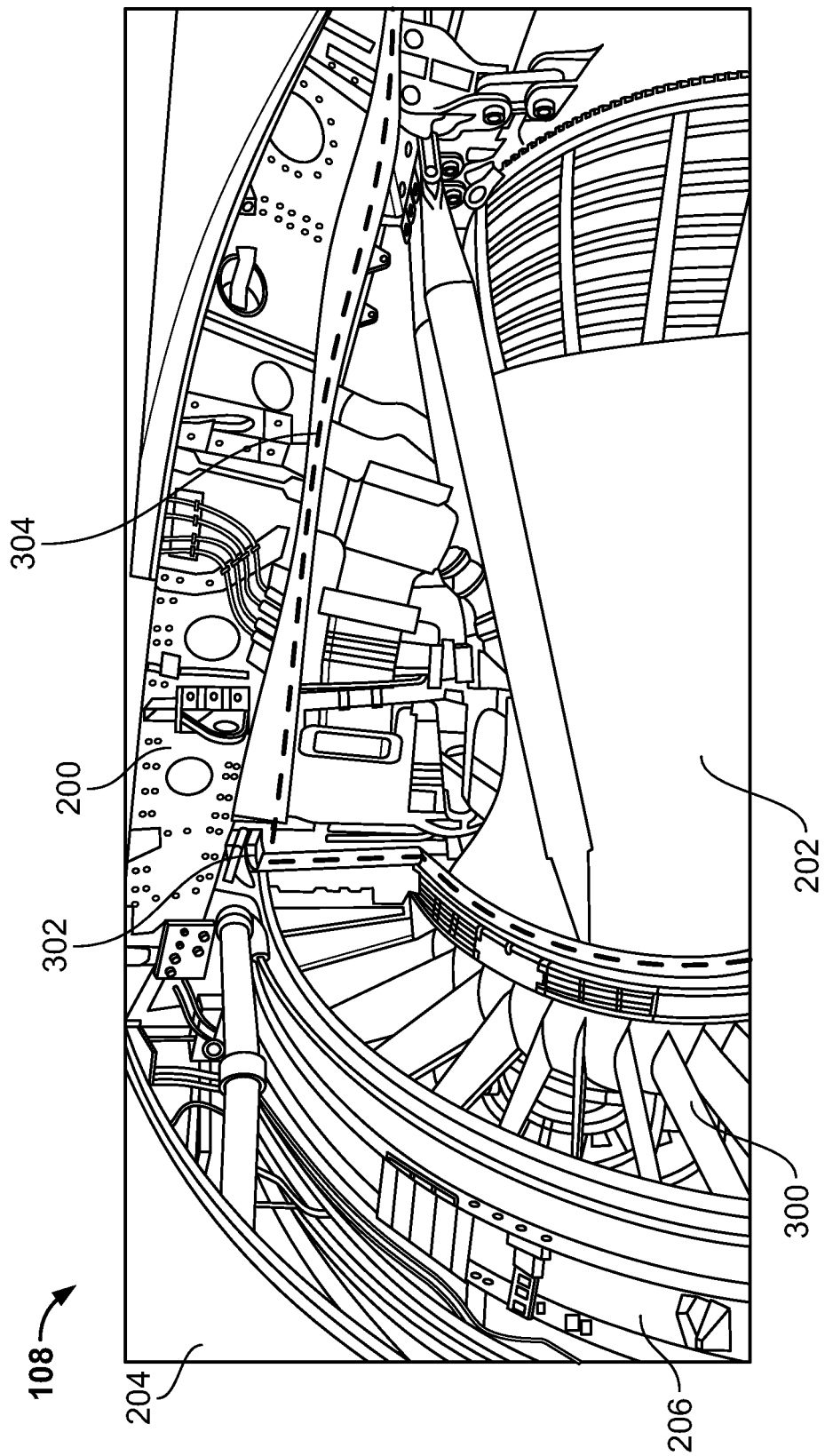
FIG. 3 is an enlarged view of a section of the engine of FIG. 2 showing an example fire seal boundary.

FIG. 3 is an enlarged view showing the pylon 200 and the first engine 108. Similar to FIG. 2, some of the panels of the nacelle 204, including the left and right thrust reverser doors, have been removed for clarity. As shown in FIG. 3, the first engine 108 includes a fan 300, which is disposed in and rotates in the fan cowl compartment 206. The first engine 108 has a firewall 302 between the fan cowl compartment 206 and the engine core 202. As explained above, the first engine 108 may include one or more fire seals formed along certain boundaries. One such fire seal boundary is shown in a dashed line (labeled 304) in FIG. 3. As shown in FIG. 3, the fire seal boundary 304 extends along the left side of the pylon 200, down a left side of the firewall 302, and along the engine core 202. The fire seal boundary 304 is formed by a left thrust reverser seal (shown in further detail) that is disposed between the left thrust reverser and the left sides of the pylon 200 and the firewall 302. Should a fire occur in the engine core 202, the left thrust reverser seal provides a sufficient seal that prevents the fire from spreading up to the pylon 200 (where the various hydraulic, electric, and fuel lines are located) and/or forward to the fan cowl compartment 206.

Figure 4:
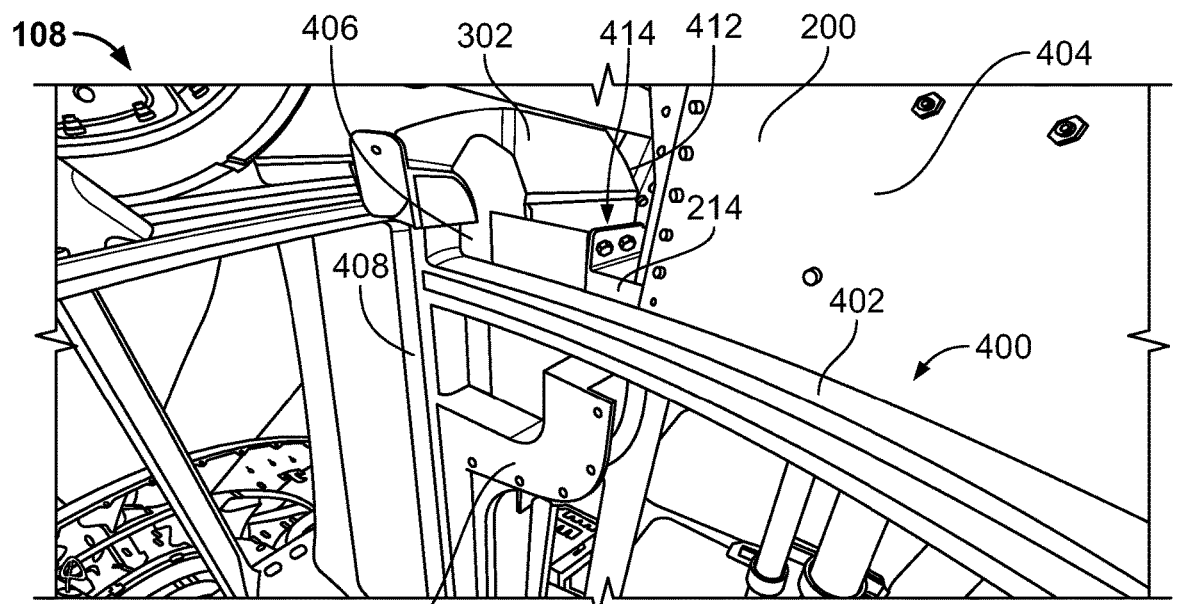
FIG. 4 illustrates an example fire seal assembly implemented in connection with the engine of FIG. 3 and which forms a fire seal between a core service disconnect (CSD) of a pylon, an engine firewall, and left and right thrust reverser seals.
Figure 5:
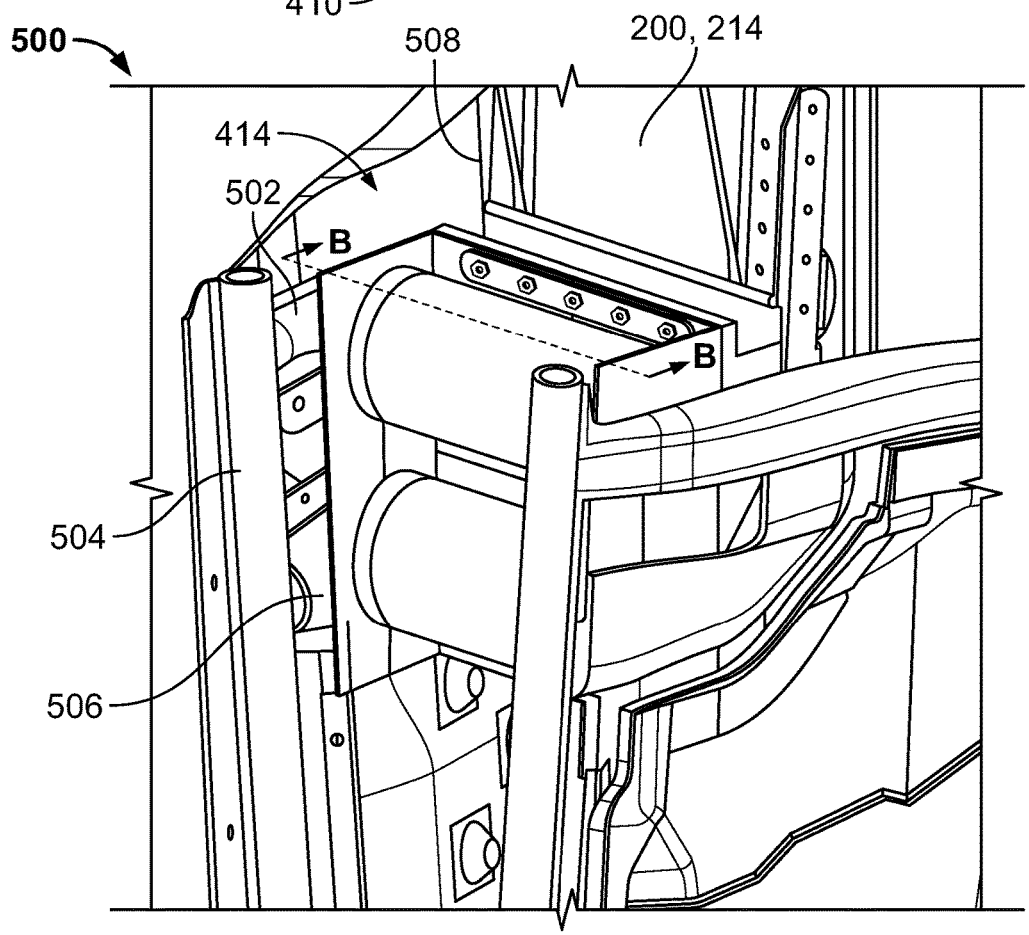
FIG. 5 is a perspective view of the example fire seal assembly of FIG. 4 and the left and right thrust reverser seals.

FIG. 4 is an enlarged view of the interface between the CSD 214 and the firewall 302. As described above, the first engine 108 includes a left TR seal 400 (referred to herein as the left TR seal assembly 400). The left TR seal assembly 400 includes a left horizontal TR seal 402 that extends along a left side 404 of the pylon 200 (and the CSD 214) to a left side 406 of the firewall 302. The left TR seal assembly 400 also includes a left vertical TR seal 408 that extends vertically along the left side 406 of the firewall 302. The left horizontal and vertical TR seals 402, 408 intersect (e.g., at a 90° angle). Further, the left TR seal assembly 400 includes a left TR barrier seal 410 that forms a corner or bend between the left horizontal TR seal 402 and the left vertical TR seal 408. The left TR seal assembly 400 forms a seal between the left TR (removed for clarity) and the left sides 404, 406 of the pylon 200 and the firewall 302. The first engine 108 similarly includes a right TR seal assembly on the right side. Referring briefly to FIG. 5, FIG. 5 shows a right TR seal assembly 500 that includes a right horizontal TR seal 502, a right vertical TR seal 504, and a right TR barrier seal 506. In FIG. 5, the firewall 302 has been removed for clarity. The right horizontal TR seal 502 extends along a right side 508 of the pylon 200 (and the CSD 214) to a right side 412 (FIG. 4) of the firewall 302 (FIG. 4). The right vertical TR seal 504 extends downward along the right side 412 of the firewall 302.

The CSD 214 and the firewall 302 are not directly coupled. Instead, the CSD 214 is spaced apart from the firewall 302. To create a fire sealed interface between the CSD 214, the firewall 302, and the left and right TR seal assemblies 400, 500, the aircraft 100 includes an example fire seal assembly 414 as shown in FIGS. 4 and 5. The example fire seal assembly 414 is disposed between the CSD 214, and the firewall 302, and the left and right horizontal TR seals 402, 502 and the left and right TR barrier seals 410, 506. The example fire seal assembly 414 functions to maintain sufficient contact between these components to prevent the spread of fire. The example fire seal assembly 414 also maintains this contact and sealing ability even when movement occurs between the first engine 108 and the pylon 200, as discussed in further detail herein.

Figure 6:
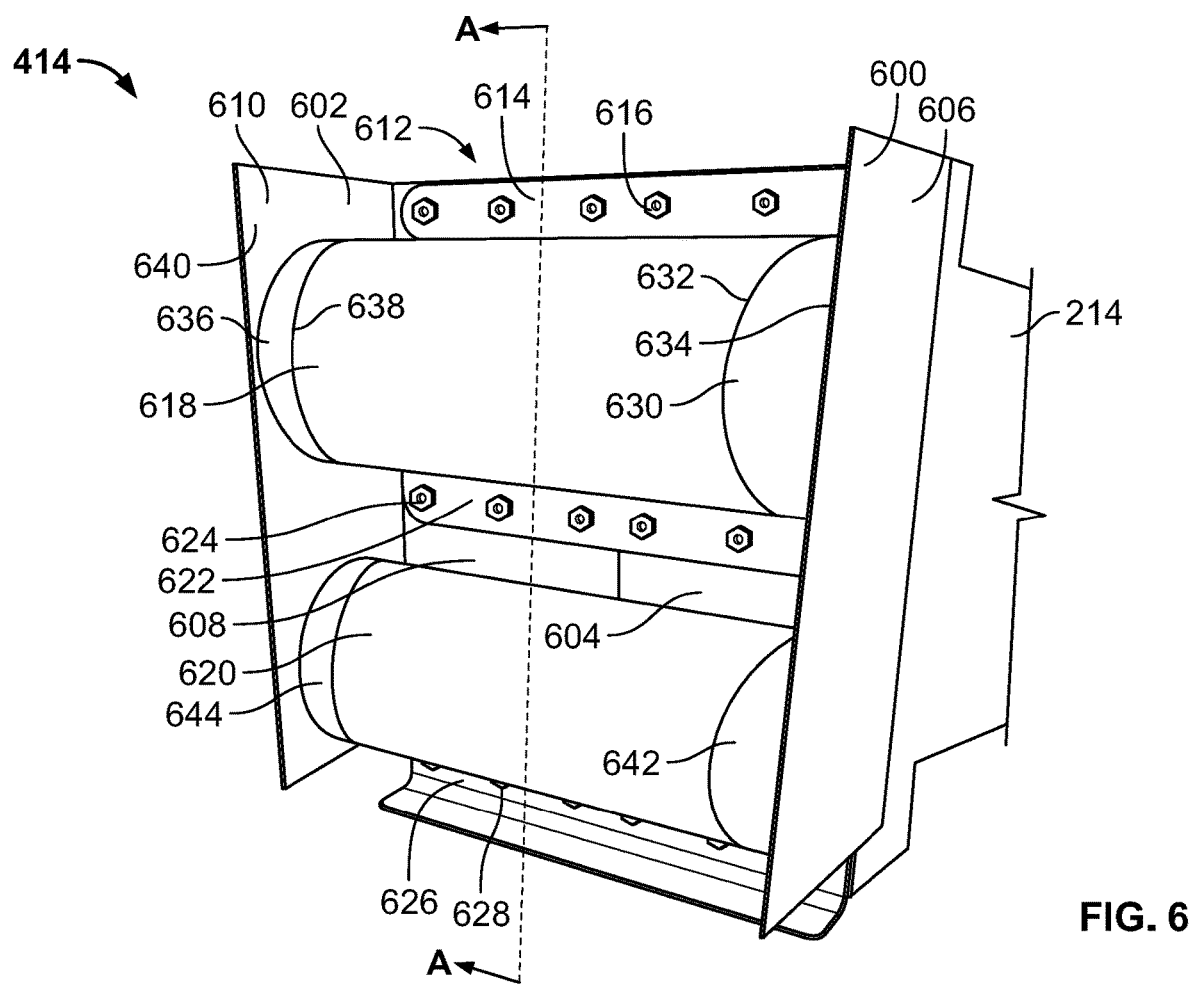
FIG. 6 is a perspective view of the example fire seal assembly of FIG. 4 coupled to the CSD. The engine and thrust reverser seals have been removed for clarity.

FIG. 6 is a perspective view of the example fire seal assembly 414 coupled to the CSD 214. The first engine 108 has been removed for clarity. In the illustrated example, the fire seal assembly 414 includes a first L-cap 600 and a second L-cap 602. The first L-cap 600 has a first leg 604 and a second leg 606 extending outward from the first leg 604 (e.g., at a 90° angle). The first L-cap 600 may be constructed of a single piece of material. Similarly, the second L-cap 602 has a third leg 608 and a fourth leg 610 extending outward from the third leg 608 (e.g., at a 90° angle). The second L-cap 602 may be constructed of a single piece of material. The legs 604, 606, 608, 610 can also be referred to as walls or flanges. The first and second L-caps 600, 602 are disposed adjacent each other and form a c- or u-shaped channel 612. In some examples, the first and second L-caps 600, 602 are constructed of a flexible material, such as silicone rubber, which enables the second and fourth legs 606, 610 to bend or deflect inward or outward as the first engine 108 moves, as disclosed in further detail herein. In other examples, the first and/or second L-caps 600, 602 may be constructed of one or more other materials.

Figure 7:
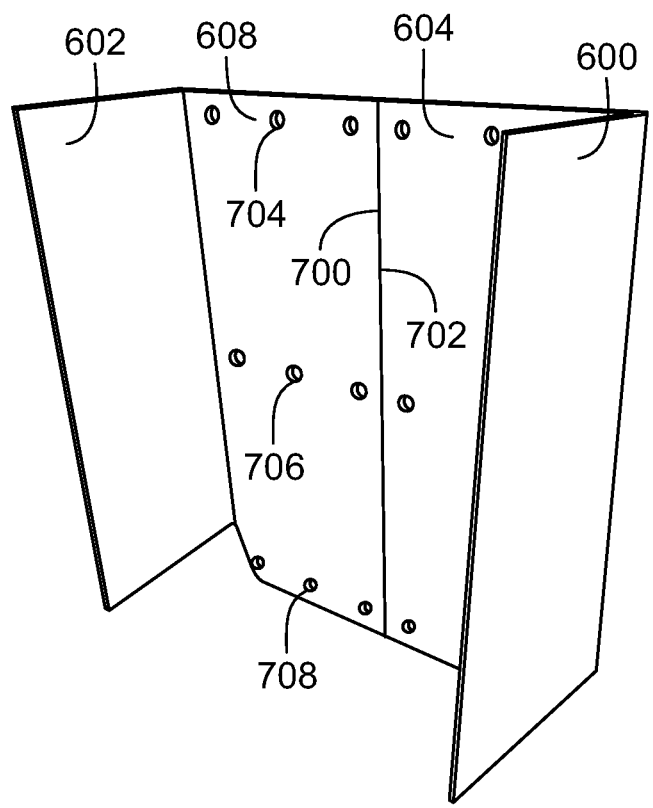
FIG. 7 is an isolated perspective view of example first and second L-caps of the example fire seal assembly of FIG. 6.

Referring briefly to FIG. 7, an isolated perspective view of the first and second L-caps 600, 602 is shown. In some examples, when the first and second L-caps 600, 602 are installed (e.g., coupled to the CSD 214 (FIG. 6)), a first inner edge 700 of the first leg 604 is in contact with a second inner edge 702 of the third leg 608. In other examples, the first and second inner edges 700, 702 are spaced apart. The first and third legs 604, 608 may include a plurality of openings to receive fasteners. For example, as shown in FIG. 7, the first and third legs 604, 608 include a first row of fastener openings 704 (one of which is referenced in FIG. 6), a second row of fastener openings 706 (one of which is referenced in FIG. 6), and a third row of fastener openings 708 (one of which is referenced in FIG. 6).

Referring back to FIG. 6, the example fire seal assembly 414 includes a retainer 614 for coupling the first and second L-caps 600, 602 to the CSD 214. The retainer 614 extends along the first and third legs 604, 608 (e.g., near a top of the first and third legs 604, 608). The retainer 614 may be constructed of a relatively rigid material, such as metal or plastic. The fire seal assembly 414 includes a first plurality of fasteners 616 (e.g., bolts, screws, etc.) (one of which is referenced in FIG. 6) that couple the first and second L-caps 600, 602 to the CSD 214. In particular, each of the first plurality of fasteners 616 extends through the retainer 614, one of the first or third legs 604, 608 (via the first plurality of fastener openings 704 (FIG. 7)), and into the CSD 214. As such, the retainer 614 securely clamps the first and third legs 604, 608 to the CSD 214.

In the illustrated example, the fire seal assembly 414 includes a first seal 618. In this example, the first seal 618 is implemented as a P-seal (referred to hereinafter as the first P-seal 618). A P-seal is sometimes referred to as a P-shaped seal, a P-profile seal, or P section seal. The first P-seal 618 is coupled to the first and third legs 604, 608 of the first and second L-caps 600, 602. The first P-seal 618 is disposed between the second and fourth legs 606, 610. In some examples, the first P-seal 618 is constructed of high temperature silicone rubber with integral plies of fabric. The first P-seal 618 contacts the firewall 302 (FIG. 4) to form a seal between the CSD 214 and the firewall 302 (FIG. 4). The first P-seal 618 can expand or compress (contract) to maintain a sufficient seal between the CSD 214 and the firewall 302 (FIG. 4).

In some examples, the fire seal assembly 414 includes a second seal. For example, as illustrated in FIG. 6, the fire seal assembly 414 includes a second seal 620 (referred to herein as the second P-seal 620), which is disposed below the first P-seal 618. The second P-seal 620 may provide additional sealing, as well as seal redundancy. In some examples, the fire seal assembly 414 may include more than two P-seals. While in this example the seals 618, 620 are implemented as P-seals, in other examples, the seals 618, 620 may be implemented as other types of seals (e.g., an omega seal).

In the illustrated example, the fire seal assembly 414 includes a first P-seal retainer 622 to couple (e.g., clamp) the first P-seal 618 to the first and third legs 604, 608. The first P-seal retainer 622 extends along the first and third legs 604, 608. The first P-seal retainer 622 may be constructed of a relatively rigid material, such as metal or plastic. A second plurality of fasteners 624 (e.g., bolts, screws, etc.) (one of which is referenced in FIG. 6) extend through the first P-seal retainer 622, the first P-seal 618, and one of the first or third legs 604, 608 (through the second plurality of fastener openings 706 (FIG. 7)). In some examples, the second plurality of fasteners 624 extend into and couple to the CSD 214, which further helps couple the fire seal assembly 414 to the CSD 214. Similarly, the fire seal assembly 414 includes a second P-seal retainer 626 and a third plurality of fasteners 628 that couple the second P-seal 620 to the first and third legs 604, 608 and/or the CSD 214.

Figure 8:
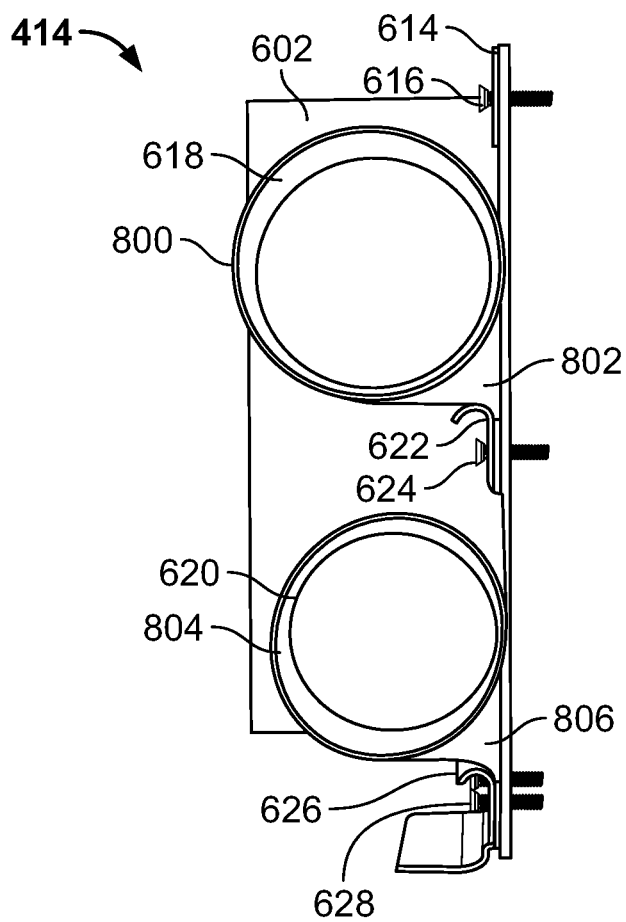
FIG. 8 is a cross-sectional view of the example fire seal assembly of FIG. 6 taken along line A-A of FIG. 6.

FIG. 8 is a cross-sectional view of the fire seal assembly 414 taken along line A-A of FIG. 6 (i.e., through the second L-cap 602). The CSD 214 has been removed for clarity. FIG. 8 shows one of the first plurality of fasteners 616 extending through the retainer 614 and the second L-cap 602. As shown in FIG. 8, the first P-seal 618 has a first ring portion 800 and a first flange portion 802 (which form a P-shaped profile). The first P-seal retainer 622 couples (e.g., clamps) the first flange portion 802 of the first P-seal 618 to the first and second L-caps 600, 602. The second plurality of fasteners 624 (one of which is referenced in FIG. 8) extends through the first P-seal retainer 622, the first flange portion 802 of the first P-seal 618, and one of the first or second L-caps 600, 602, to couple the first P-seal 618 to the first and second L-caps 600, 602.

Similarly, the second P-seal 620 has a second ring portion 804 and a second flange portion 806. The second P-seal retainer 826 clamps the second flange portion 806 of the second P-seal 620 to the first and second L-caps 600, 602. The third plurality of fasteners 628 (one of which is referenced in FIG. 8) extends through the second P-seal retainer 626, the second flange portion 806 of the second P-seal 620, and one of the first or second L-caps 600, 602 to couple the second P-seal 620 to the first and second L-caps 600, 602.

Referring back to FIG. 6, the fire seal assembly 414 may include one or more end plugs to ensure a tight seal between the first and second P-seals 618, 620 and the second and fourth legs 606, 610. As disclosed in further detail herein, the second and fourth legs 606, 610 may bend inward or outward as the first engine 108 moves. Therefore, to ensure a tight seal, the fire seal assembly 414 may include end plugs between the first and second P-seals 618, 620 and the second and fourth legs 606, 610. For example, as shown in FIG. 6, the fire seal assembly 414 includes a first end plug 630 coupled to a first end 632 of the first P-seal 618. The first end plug 630 is disposed between first end 632 of the first P-seal 618 and an inner surface 634 of the second leg 606. In this example, the first end plug 630 is constructed of foam (e.g., a fire resistant foam, silicone rubber foam). As such, the first end plug 630 expands or compresses (contracts) to fill any gap or space between the first end 632 of the first P-seal 618 and the inner surface 634 of the second leg 606 as the second leg 606 deflects inward or outward, thereby ensuring a tightly sealed interface between the first P-seal 618 and the second leg 606. Similarly, a second end plug 636 is coupled to a second end 638 of the first P-seal 618. The second end plug 636 is disposed between the second end 638 of the first P-seal 618 and an inner surface 640 of the fourth leg 610. The second end plug 636 is also constructed of foam (e.g., a fire resistant foam, silicone rubber foam). As such, the second end plug 636 can expand or compress to fill any gap or space between the second end 638 of the first P-seal 618 and the inner surface 640 of the fourth leg 610 as the fourth leg 610 deflects inward or outward, thereby ensuring a tightly sealed interface between the first P-seal 618 and the fourth leg 610. The first and second end plugs 630, 636 also help to keep fuel and other debris out of the first P-seal 618.

In the illustrated example, the first and second ends 632, 638 of the first P-seal 618 are tapered. In other words, a distance between the first and second ends 632, 638 near the first and third legs 604, 608 is longer than a distance between the first and second ends 632, 638 near the opposite end (the end that engages the firewall 302). As such, in this example, the first and second end plugs 630, 636 are wedge-shaped, which enables the first and second end plugs 630, 636 to fill the wedge-shaped spaces between the first P-seal 618 and the second and fourth legs 606, 610. The fire seal assembly 414 similarly includes end plugs 642, 644 for the second P-seal 620. The end plugs 642, 644 are substantially the same as the first and second end plugs 630, 636.

Figure 9:
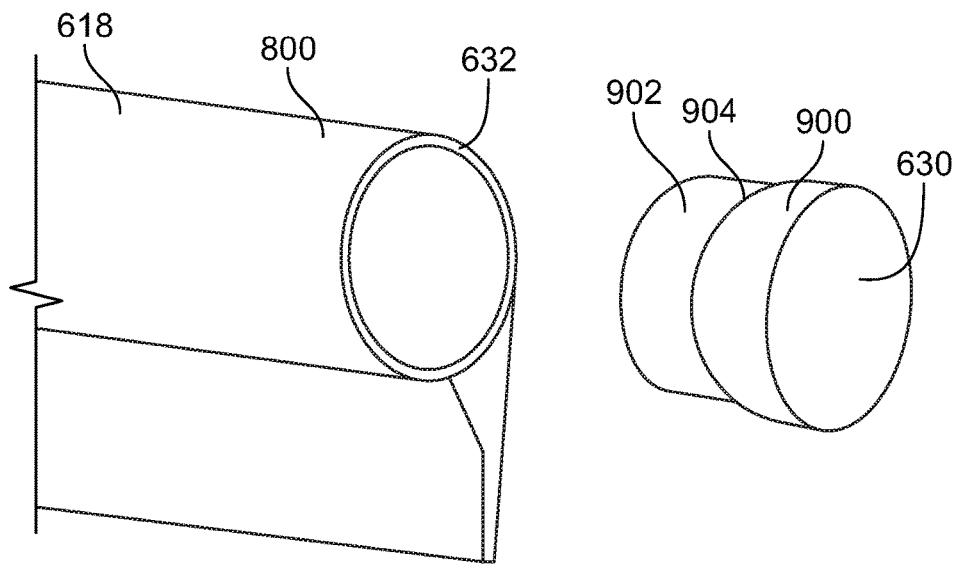
FIG. 9 shows an example end plug for an example P-seal of the example fire seal assembly of FIG. 6.

FIG. 9 shows the first end plug 630 as separated from the first end 632 of the first P-seal 618. The first end plug 630 has a first portion 900 and a second portion 902. A step 904 is formed between the first and second portions 900, 902. When the first end plug 630 is coupled to the first end 632, the second portion 902 extends into the first end 632 of the first P-seal 618, the step 904 engages the first end 632 of the first P-seal 618, and the first portion 900 remains disposed outside of the first P-seal 618. In some examples, the outer diameter of the first portion 900 is the same as the outer diameter of the first ring portion 800 of the first P-seal 618. In some examples, the first end plug 630 is coupled to the first end 632 of the first P-seal 618 via an adhesive (e.g., glue). Additionally or alternatively, the interface between the second portion 902 of the first end plug 630 and the first ring portion 800 of the first P-seal 618 may form an interference fit (e.g., a friction fit) that couples the first end plug 630 to the first end 632 of the first P-seal 618. The other plugs 636, 642, 644 may be similarly structured and coupled to their respective ends of the first and second P-seals 618, 620.

Figure 10:
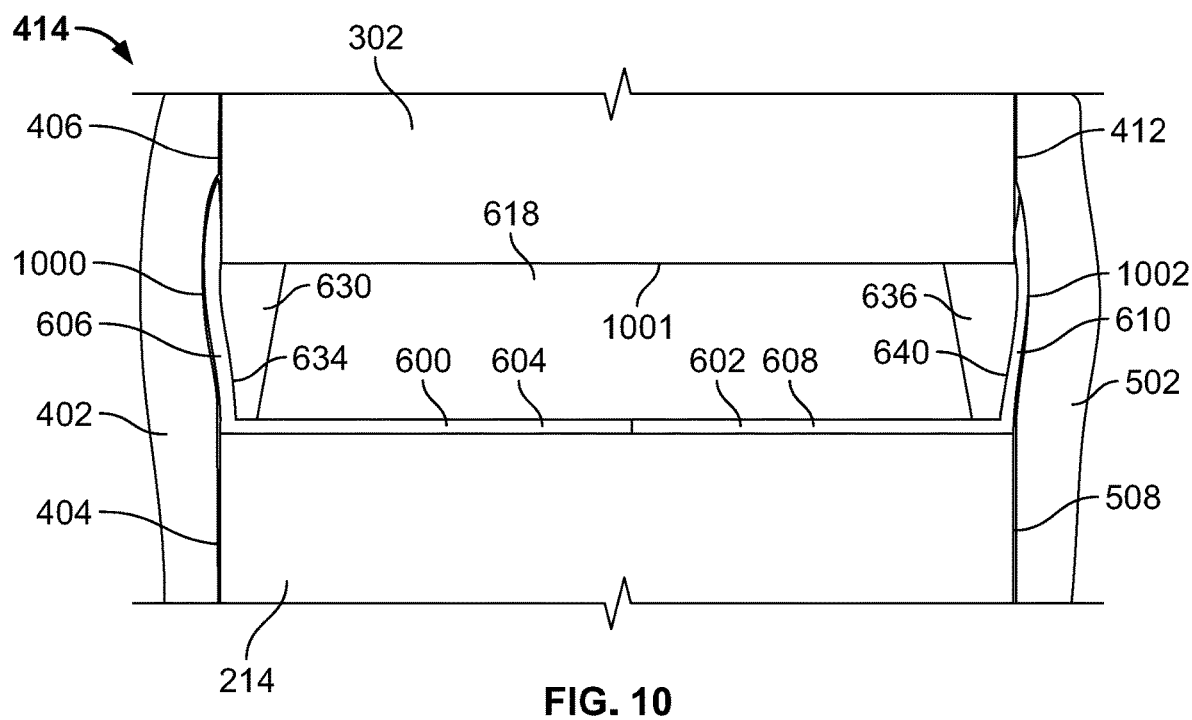
FIG. 10 is a top view showing the example fire seal assembly of FIG. 4 between the CSD, the engine firewall, and the left and right thrust reverser seals.

FIG. 10 is a top view showing the fire seal assembly 414 between the CSD 214, the firewall 302, and the left and right horizontal TR seals 402, 502. As shown in FIG. 10, the first P-seal 618 (as well as the second P-seal 620 (FIG. 6)) and the first and second end plugs 630, 636 are compressed between the first and third legs 604, 608 and an aft surface 1001 of the firewall 302 and, thus, maintain solid contact between these parts. If the first engine 108 (along with the firewall 302) moves forward or rearward (up or down in FIG. 10), the first P-seal 618 and the first and second end plugs 630, 636 expand or compress to take up any space and ensure a sufficient seal between the CSD 214 and the firewall 302. While in the illustrated example the first P-seal 618 is in direct contact with the aft surface 1001 of the firewall 302, in other examples, a plate may be mounted to the aft surface 1001 of the firewall 302 for the first P-seal 618 to slide against while expanding or compressing.

As shown in FIG. 10, the second leg 606 of the first L-cap 600 extends outwards from the first leg 604 and is contact with the left side 406 of the firewall 302. The first horizontal TR seal 402 extends along and is in contact with the left side 404 of the CSD 214, an outer surface 1000 of the second leg 606, and the left side 406 of the firewall 302. As can been seen from FIG. 10, at least a portion of the second leg 606 is disposed between the left horizontal TR seal 402 and the left side 406 of the firewall 302. Further, the first end plug 630 is in contact with the inner surface 634 of the second leg 606. Therefore, a tight interface is formed between the right horizontal TR seal 402, the second leg 606, the first end plug 630, and first P-seal 618. If the first engine 108 moves forward or rearward (up or down in FIG. 10), for example, the firewall 302 slides along the inner surface 634 of the second leg 606. The second leg 606, the first end plug 630, and the first P-seal 618 cooperate to ensure a tight seal between the left horizontal TR seal 402, the CSD 214, and the firewall 302 on the left side.

Similarly, the fourth leg 610 of the second L-cap 602 extends outward from the third leg 608 and is contact with the right side 412 of the firewall 302. The second horizontal TR seal 502 extends along and is in contact with the right side 508 of the CSD 214, and outer surface 1002 of the fourth leg 610, and the right side 412 of the firewall 302. As can been seen from FIG. 10, at least a portion of the fourth leg 610 is disposed between the right horizontal TR seal 502 and the right side 412 of the firewall 302. Further, the second end plug 636 is in contact with the inner surface 640 of the fourth leg 610. Therefore, a tight interface is formed between the left horizontal TR seal 502, the fourth leg 610, the second end plug 636, and first P-seal 618. If the first engine 108 moves forward or rearward (up or down in FIG.

10), for example, the firewall 302 slides along the inner surface 640 of the fourth leg 610. The fourth leg 610, the second end plug 636, and the first P-seal 618 cooperate to ensure a tight seal between the right horizontal TR seal 502, the CSD 214, and the firewall 302 on the right side.

As shown in FIG. 10, the second and fourth legs 606, 610 are tapered. In some examples, this taper provides a smooth transition for ensuring sufficient contact between the left and right horizontal TR seals 402, 502 and the respective left and right sides 406, 412 of the firewall 302. In the illustrated example of FIG. 12, the first end plug 630 is separated from the left horizontal TR seal 402 by the second leg 606, such that no contact occurs between the first end plug 630 and the left horizontal TR seal 402. Similarly, the second end plug 636 is separated from the right horizontal TR seal 502 by the fourth leg 610, such that no contact occurs between the second end plug 638 and the right horizontal TR seal 502.

Figure 11:
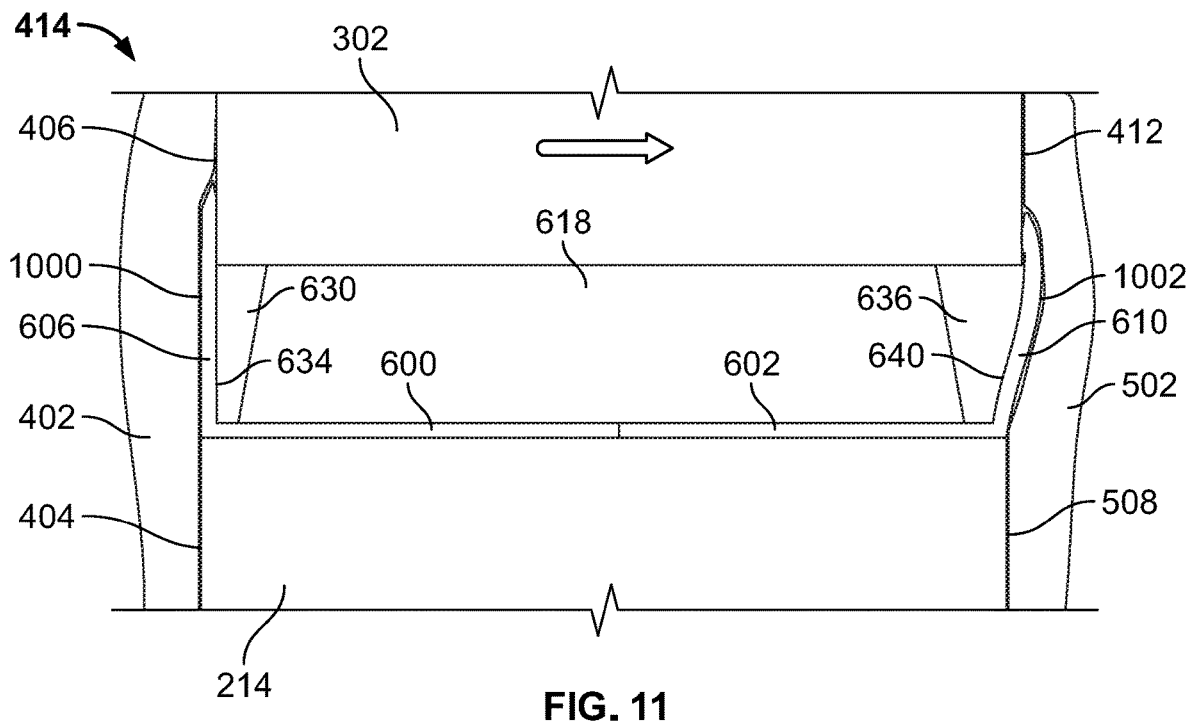
FIG. 11 is the top view of FIG. 10 illustrating an example in which the engine firewall of FIG. 10 has moved sideways.

As disclosed above, in addition to forward and rearward movement, the first engine 108 may also move laterally or sideways (left or right in FIG. 10). FIG. 11 shows an example in which the first engine 108 (and the firewall 302) has translated and/or rotated slightly to the right (e.g., inboard) relative to the CSD 214, as shown by the arrow. As shown in FIG. 11, the second leg 606 of the first L-cap 600 has been bent or deflected inward (to the right) relative to the position in FIG. 10. The left horizontal TR seal 402 has expanded slightly and remains engaged with the left side 404 of the CSD 214, an outer surface 1000 of the second leg 606, and the left side 406 of the firewall 302. Additionally, the first end plug 630 has been compressed, but still fills the space between the first P-seal 618 and the inner surface 634 of the second leg 606. Thus, the second leg 606, the first end plug 630, and the first P-seal 618 cooperate to ensure a tight seal between the left horizontal TR seal 402, the CSD 214, and the firewall 302 on the left side.

Further, as shown in FIG. 11, the fourth leg 610 of the second L-cap 602 is bent or deflected outward (to the right in FIG. 11) compared to the position in FIG. 10. The right horizontal TR seal 502 has slightly compressed but remains engaged with the right side 508 of the CSD 214, the outer surface 1002 of the fourth leg 610, and the right side 412 of the firewall 302. Additionally, the second end plug 636 has expanded to fill any space between the first P-seal 618 and the inner surface 640 of the fourth leg 610. Thus, the fourth leg 610, the second end plug 636, and the first P-seal 618 cooperate to ensure a tight seal between the right horizontal TR seal 502, the CSD 214, and the firewall 302 on the right side.

In addition, the first and second L-caps 600, 602 also help to maintain a sufficient seal during vertical movement of the first engine 108. In such an instance, the first and second horizontal TR seals 402, 502 may slide up or down along the outer surfaces 1000, 1002 of the second and fourth legs 606, 610. The second and fourth legs 606, 610 again ensure a tight seal between the left and right horizontal TR seals 402, 502, the firewall 302, and the CSD 214.

Figure 12:
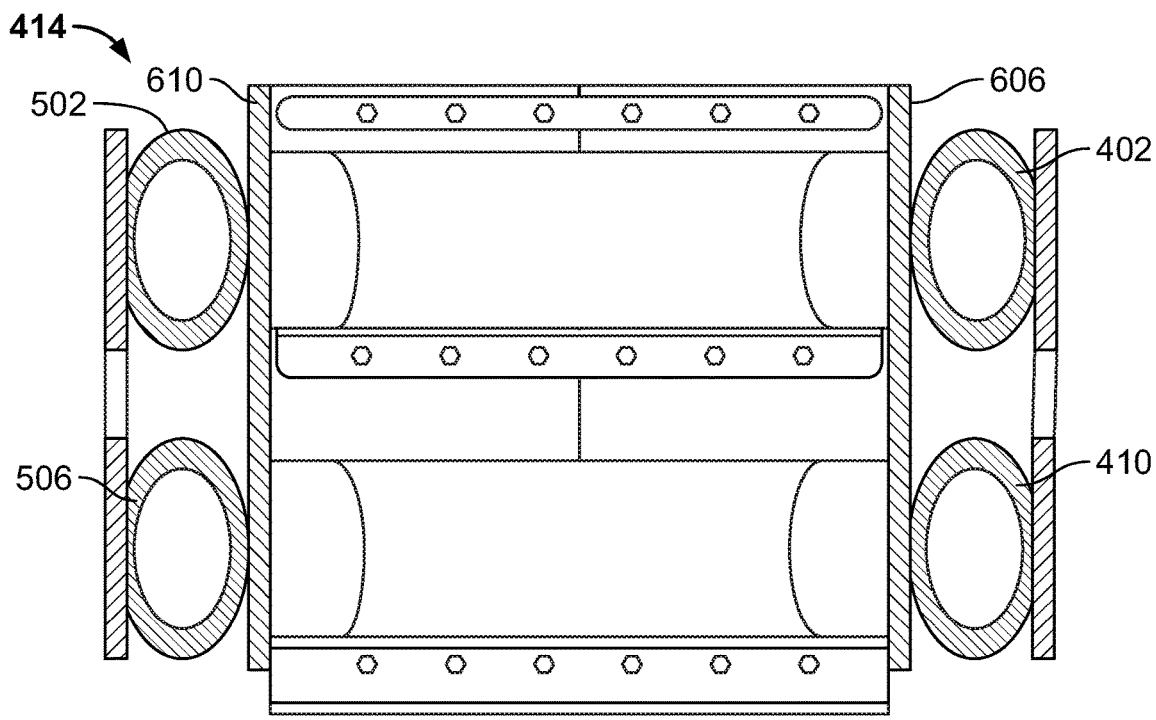
FIG. 12 is a cross-sectional view of the example fire seal assembly and the example left and right thrust reverser seals taken along line B-B of FIG. 5.

FIG. 12 is a cross-sectional view of the example fire seal assembly 414 and the left and right horizontal TR seals 402, 502 taken along line B-B of FIG. B. Also shown in FIG. 12 are the left and right TR barrier seals 410, 506. As shown in FIG. 12, the left and right horizontal TR seals 402, 502 and the left and right TR barrier seals 410, 506 are omega seals (which have an omega shaped profile). The left and right horizontal TR seals 402, 502 and the left and right TR barrier seals 410, 506 expand or compress (contract) to maintain contact with the second and fourth legs 606, 610. As can be understood from FIG. 12, even if the left and right horizontal TR seals 402, 502 move vertically (up and down in FIG. 12), solid contact is maintained between the left and right horizontal TR seals 402, 502 and the respective second and fourth legs 606, 610. Similarly, solid contact is maintained between the left and right TR barrier seals 410, 506 and the respective second and fourth legs 606, 610. Known fire seal assemblies do not have the disclosed L-caps. Instead, the left and right horizontal TR seals 402, 502 are in direct contact with the ends of the first P-seal 618. The example first and second L-caps 600, 602 disclosed herein maintain a tight sealing interface between these components throughout larger ranges of movement.

While in the illustrated examples the first and second L-caps 600, 602 are described as being two separate components, in other examples, the first and second L-caps 600, 602 may be combined a single unitary part or component. For example, the first and second L-caps 600, 602 may be constructed as a single-piece c- or u-shaped profile. Further, while the examples disclosed herein are described in connection with the first engine 108 and the pylon 200, a similar fire seal assembly may likewise be implemented in connection with the second engine 110 on the second wing 106.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example fire seal assemblies have been disclosed that provide excellent sealing between an engine, a pylon, and thrust reverser areas. The example fire seal assemblies disclosed herein provide flexible smooth contact that maintains sealing function throughout larger ranges of movement of an engine and higher operating temperatures than known fire seal assemblies. As such, the example fire seal assemblies disclosed herein enable the use of larger, more powerful engines on aircraft.

The following paragraphs provide various examples and combinations of the examples disclosed herein.

Example 1 includes a fire seal assembly comprising a first L-cap having a first leg and a second leg extending outward from the first leg and a second L-cap having a third leg and a fourth leg extending outward from the third leg. The first and second L-caps are disposed adjacent each other and form a u-shaped channel. The first and third legs are to be coupled to a core service disconnect (CSD) on a pylon of an aircraft. The second and fourth legs are to extend outward and engage sides of a firewall of an engine of the aircraft. The fire seal assembly of Example 1 also includes a seal coupled to the first and third legs and disposed between the second and fourth legs, a first end plug disposed between a first end of the seal and an inner surface of the second leg, and a second end plug disposed between a second end of the seal and an inner surface of the fourth leg.

Example 2 includes the fire seal assembly of Example 1, wherein the first and second L-caps are constructed of silicone rubber.

Example 3 includes the fire seal assembly of Examples 1 or 2, wherein the first and second end plugs are constructed of foam.

Example 4 includes the fire seal assembly of Example 3, wherein the first and second end plugs expand or compress as the second and fourth legs are deflected inward or outward.

Example 5 includes the fire seal assembly of any of Examples 1-4, wherein the first end and the second end of the seal are tapered.

Example 6 includes the fire seal assembly of any of Examples 1-5, wherein the first and second end plugs are wedge-shaped.

Example 7 includes the fire seal assembly of any of Examples 1-6, wherein a first portion of the first end plug is disposed outside of the seal and a second portion of the first end plug extends into the seal.

Example 8 includes the fire seal assembly of Example 7, wherein the first end plug includes a step formed between the first and second portions.

Example 9 includes the fire seal assembly of any of Examples 1-8, wherein an inner edge of the first leg is in contact with an inner edge of the third leg.

Example 10 includes the fire seal assembly of any of Examples 1-9, wherein the seal is a P-seal.

Example 11 includes the fire seal assembly of Example 10, wherein a flange portion of the P-seal is coupled to the first and third legs via a retainer.

Example 12 includes the fire seal assembly of Examples 10 or 11, wherein the P-seal is a first P-seal, further including a second P-seal coupled to the first and third legs and disposed between the second and fourth legs.

Example 13 includes an aircraft comprising a pylon with a core service disconnect (CSD), an engine coupled to the pylon, the engine having a firewall, a left horizontal thrust reverser seal extending along a left side of the CSD and a left side of the firewall, a right horizontal thrust reverser seal extending along a right side of the CSD and a right side of the firewall, and a fire seal assembly. The fire seal assembly includes a first L-cap having a first leg coupled to the CSD and a second leg extending outward from the first leg and in contact with the left side of the firewall. At least a portion of the left horizontal thrust reverser seal is in contact with an outer surface of the second leg. The fire seal assembly also includes a second L-cap having a third leg coupled to the CSD and a fourth leg extending outward from the third leg and in contact with the right side of the firewall. At least a portion of the right horizontal thrust reverser seal is in contact with an outer surface of the fourth leg. The fire seal assembly further includes a seal disposed between the second and fourth legs.

Example 14 includes the aircraft of Example 13, wherein at least a portion of the second leg is disposed between the left horizontal thrust reverser seal and the left side of the firewall, and at least a portion of the fourth leg is disposed between the right horizontal thrust reverser seal and the right side of the firewall.

Example 15 includes the aircraft of Examples 13 or 14, wherein the second and fourth legs are bendable inward or outward as the engine moves sideways.

Example 16 includes the aircraft of Example 15, wherein the first and second L-caps are constructed of silicone rubber.

Example 17 includes the aircraft of any of Examples 13-16, wherein the firewall is to slide along inner surfaces of the second and fourth legs as the engine moves forward or rearward.

Example 18 includes the aircraft of any of Examples 13-17, wherein the fire seal assembly includes a first end plug disposed between a first end of the seal and an inner surface of the second leg and a second end plug disposed between a second end of the seal and an inner surface of the fourth leg.

Example 19 includes the aircraft of Example 18, wherein the first end plug is separated from the left horizontal thrust reverser seal by the second leg, and the second end plug is separated from the right horizontal thrust reverser seal by the fourth leg.

Example 20 includes the aircraft of any of Examples 13-19, wherein the left and right horizontal thrust reverser seals are omega seals.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fire seal assembly comprising:
   a first L-cap having a first leg and a second leg extending outward from the first leg;
   a second L-cap having a third leg and a fourth leg extending outward from the third leg, the first and second L-caps disposed adjacent each other and forming a u-shaped channel, the first and third legs to be coupled to a core service disconnect (CSD) on a pylon of an aircraft, the second and fourth legs to extend outward and engage sides of a firewall of an engine of the aircraft;
   a seal coupled to the first and third legs and disposed between the second and fourth legs;
   a first end plug disposed between a first end of the seal and an inner surface of the second leg; and
   a second end plug disposed between a second end of the seal and an inner surface of the fourth leg.

2. The fire seal assembly of claim 1, wherein the first and second L-caps are constructed of silicone rubber.

3. The fire seal assembly of claim 1, wherein the first and second end plugs are constructed of foam.

4. The fire seal assembly of claim 3, wherein the first and second end plugs expand or compress as the second and fourth legs are deflected inward or outward.

5. The fire seal assembly of claim 1, wherein the first end and the second end of the seal are tapered.

6. The fire seal assembly of claim 1, wherein the first and second end plugs are wedge-shaped.

7. The fire seal assembly of claim 1, wherein a first portion of the first end plug is disposed outside of the seal and a second portion of the first end plug extends into the seal.

8. The fire seal assembly of claim 7, wherein the first end plug includes a step formed between the first and second portions.

9. The fire seal assembly of claim 1, wherein an inner edge of the first leg is in contact with an inner edge of the third leg.

10. The fire seal assembly of claim 1, wherein the seal is a P-seal.

11. The fire seal assembly of claim 10, wherein a flange portion of the P-seal is coupled to the first and third legs via a retainer.

12. The fire seal assembly of claim 10, wherein the P-seal is a first P-seal, further including a second P-seal coupled to the first and third legs and disposed between the second and fourth legs.

13. An aircraft comprising:
   a pylon with a core service disconnect (CSD);
   an engine coupled to the pylon, the engine having a firewall;
   a left horizontal thrust reverser seal extending along a left side of the CSD and a left side of the firewall;
   a right horizontal thrust reverser seal extending along a right side of the CSD and a right side of the firewall; and
   a fire seal assembly including:
      a first L-cap having a first leg coupled to the CSD and a second leg extending outward from the first leg and in contact with the left side of the firewall, at least a portion of the left horizontal thrust reverser seal in contact with an outer surface of the second leg;
      a second L-cap having a third leg coupled to the CSD and a fourth leg extending outward from the third leg and in contact with the right side of the firewall, at least a portion of the right horizontal thrust reverser seal in contact with an outer surface of the fourth leg; and
      a seal disposed between the second and fourth legs.

14. The aircraft of claim 13, wherein at least a portion of the second leg is disposed between the left horizontal thrust reverser seal and the left side of the firewall, and at least a portion of the fourth leg is disposed between the right horizontal thrust reverser seal and the right side of the firewall.

15. The aircraft of claim 13, wherein the second and fourth legs are bendable inward or outward as the engine moves sideways.

16. The aircraft of claim 15, wherein the first and second L-caps are constructed of silicone rubber.

17. The aircraft of claim 13, wherein the firewall is to slide along inner surfaces of the second and fourth legs as the engine moves forward or rearward.

18. The aircraft of claim 13, wherein the fire seal assembly includes:
   a first end plug disposed between a first end of the seal and an inner surface of the second leg; and
   a second end plug disposed between a second end of the seal and an inner surface of the fourth leg.

19. The aircraft of claim 18, wherein the first end plug is separated from the left horizontal thrust reverser seal by the second leg, and the second end plug is separated from the right horizontal thrust reverser seal by the fourth leg.

20. The aircraft of claim 13, wherein the left and right horizontal thrust reverser seals are omega seals.

* * * * *